(12) United States Patent
Miyahara et al.

(10) Patent No.: US 8,724,094 B2
(45) Date of Patent: May 13, 2014

(54) APPARATUS AND METHOD OF RECOGNIZING PRESENCE OF OBJECTS

(75) Inventors: Takayuki Miyahara, Kariya (JP); Takashi Ogawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 282 days.

(21) Appl. No.: 13/083,735

(22) Filed: Apr. 11, 2011

(65) Prior Publication Data
US 2011/0248880 A1 Oct. 13, 2011

(30) Foreign Application Priority Data

Apr. 9, 2010 (JP) ................................. 2010-090790
Feb. 7, 2011 (JP) ................................. 2011-024135

(51) Int. Cl.
*G01C 3/08* (2006.01)
(52) U.S. Cl.
USPC ....... 356/5.01; 356/3.01; 356/3.09; 356/4.01; 356/4.07; 356/5.09; 356/9; 356/625
(58) Field of Classification Search
CPC ......... G01S 17/10; G01S 7/497; G01S 17/89; G01S 7/487; G01C 3/08
USPC ........... 356/4.01, 5.01, 3.01–3.09, 4.07, 5.09, 356/9, 625
See application file for complete search history.

(56) References Cited

U.S. PATENT DOCUMENTS

| 7,567,204 | B2 * | 7/2009 | Sakamoto ..................... 342/91 |
| 2005/0036130 | A1 | 2/2005 | Arita et al. |
| 2005/0093735 | A1 | 5/2005 | Samukawa et al. |
| 2007/0276599 | A1 * | 11/2007 | Ogawa ......................... 701/300 |
| 2009/0096661 | A1 * | 4/2009 | Sakamoto ..................... 342/92 |

FOREIGN PATENT DOCUMENTS

| JP | A-07-229727 | 8/1995 |
| JP | A-07-229728 | 8/1995 |
| JP | 2004-198323 | 7/2004 |
| JP | A-2004-317323 | 11/2004 |
| JP | B2-3994941 | 8/2007 |
| JP | A-2010-032430 | 2/2010 |

* cited by examiner

*Primary Examiner* — Isam Alsomiri
*Assistant Examiner* — Samantha K Abraham
(74) *Attorney, Agent, or Firm* — Posz Law Group, PLC

(57) ABSTRACT

An apparatus and method for recognizing presence of an object is provided, the apparatus and method are mounted on or implemented a vehicle. In the apparatus and method, by scanning a beam-shaped electromagnetic wave, data showing reflection intensities of reflected waves and distances between the vehicle and objects outside the vehicle are obtained. Based on the detected data, characteristics presented by frequency distributions of the distances and intensity frequency distributions of the refection intensities obtained in multiple rows in a field of view in the height direction of the vehicle. The characteristics depend on an angle of the electromagnetic wave to a road on which the vehicle travels. It is determined that the characteristics are obtained from the road when the characteristics meet predetermined requirements.

15 Claims, 11 Drawing Sheets

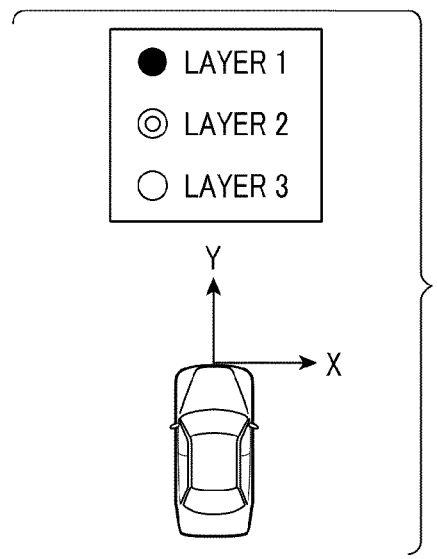
FIG.5A
FIG.5B
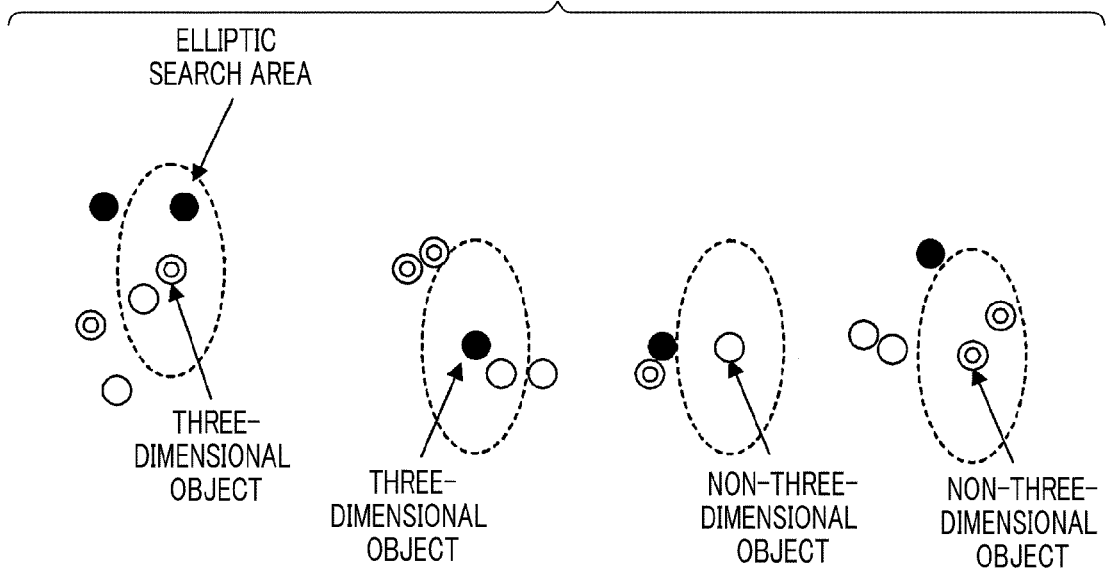
FIG.5C
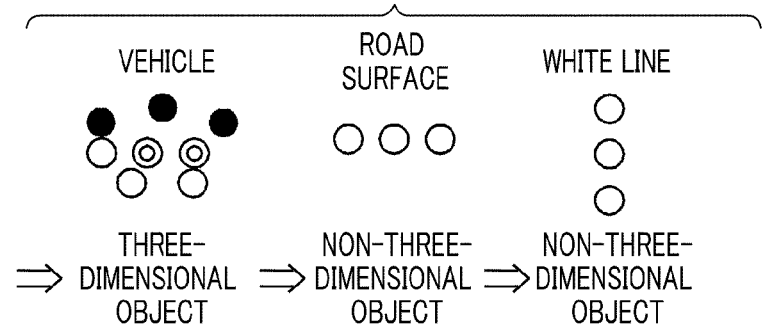

(DISTANCE HISTOGRAM)

(REFLECTION INTENSITY HISTOGRAM)

(BEAM DISTANCES RELATIVE TO LAYERS)

(EXTENT WHERE CORRESPONDING DATA ARE EXPECTED TO BE PRESENT)

(RELATIONSHIP BETWEEN LAYERS REGARDING REFLECTION INTENSITY)

($S_i$ AND $S_j$ ARE CALCULATED BASED ON SCATTERING CHARACTERISTIC MODEL)

APPARATUS AND METHOD OF RECOGNIZING PRESENCE OF OBJECTS

CROSS-REFERENCE TO RELATED APPLICATION

This application is based on and claims the benefit of priorities from earlier Japanese Patent Application Nos. 2010-090790 and 2011-024135 filed Apr. 9, 2010 and Feb. 7, 2011, respectively, the descriptions of which are incorporated herein by reference.

BACKGROUND OF THE INVENTION

1. Technical Field of the Invention

The present invention relates to an apparatus and method of recognizing objects which are present outside a vehicle, and in particular, to the apparatus and method that use a technique for transmitting, from the vehicle, electromagnetic waves toward a predetermined field extending in both a widthwise direction (transverse direction) and a heightwise direction (direction vertical to a road surface) of a vehicle, and for recognizing objects based on the reflected electromagnetic waves.

2. Related Art

An object recognition apparatus has been under development, in which transmission waves, such as laser beams or millimeter waves, are emitted and an object in the forward direction of the vehicle concerned is recognized by detecting the reflected waves. Such an apparatus is applied, for example, to a device for detecting an obstacle, such as a preceding vehicle, to raise an alarm, or to a device for controlling vehicle speed such that a distance between a preceding vehicle and the vehicle concerned is maintained. Thus, the object recognition apparatus is used for recognizing an object, such as a preceding vehicle.

In performing such object recognition, it is expected that measured-distance data obtained from objects other than an object to be controlled are removed, for example, to enhance the accuracy of recognition. In this regard, JP-B-3994941 suggests a method for recognizing the distance data regarding a road surface by distinguishing it from the distance data regarding an obstacle (three-dimensional object), such as a preceding vehicle.

This method uses a mechanism that changes the mounting angle of a mechanism, per se, that emits transmission waves and receives reflected waves, as shown in JP-B-3994941. With this method, the angle of emitting transmission waves is vertically changed to determine whether or not a received distance data corresponds to a reflection from a road surface that is not a three-dimensional object.

Specifically, in performing detection, transmission waves are emitted in the widthwise direction of the vehicle in a normal state where the optical axis is substantially horizontal (normal scan mode). When a target does reside in the forward direction, transmission waves are emitted subsequently with the optical axis being directed downward (downward scan mode). Then, if the detected distance of the target changes in a manner the target approaches the vehicle, it is determined that the reflected datum is of the road surface, as shown in JP-B-3994941.

More specifically, the method disclosed in JP-B-3994941 is based on the following concept. That is, regarding the distance data obtained from a three-dimensional object, such as a preceding vehicle, the object will be detected at a position of substantially the same distance, even when the direction of the optical axis is changed from the substantially horizontal direction to the downward direction. On the other hand, regarding the distance data obtained from a road surface as an object, the distance data will change in a manner the object (road surface) approaches the vehicle. Thus, a three-dimensional object can be distinguished from a road surface.

However, the object recognition technique disclosed in JP-B-3994941 is originally based on an object recognition technique of one-dimensional scan in which transmission waves are emitted in the widthwise direction of the vehicle. Therefore, in order to determine a distance data as being of a road surface, the direction of the optical axis has to be changed downward until the direction matches an angle that enables acquisition of a distance data corresponding to the reflection from the road surface such that it is not a three-dimensional object.

Meanwhile, an object recognition technique using two-dimensional scan has been known, which does not entail such a change of the mounting angle of a mechanism, per se, for the optical axis matching. In this technique, beams are emitted along scan directions, i.e. widthwise and heightwise directions of the vehicle. However, the object recognition technique using two-dimensional scan is based on a premise of recognizing three-dimensional objects, such as a preceding vehicle or a roadside object, and thus is not configured to determine whether or not a distance data in question corresponds to the reflection from a road surface.

Therefore, the object recognition technique using two-dimensional scan is not able to distinguish whether or not an acquired datum is the reflected datum obtained from an object (three-dimensional object) or the reflected datum obtained from a road surface. Accordingly, with this technique, a reflected datum is likely to be erroneously recognized as being the reflected datum obtained from an object in spite of the fact that the reflected datum is of a road surface.

Specifically, in recognizing an object in the forward direction of the vehicle by emitting transmission waves, such as laser beams or millimeter waves, and detecting the reflected waves, reception signals as the reflected waves include information mixing up both the information on a road surface and the information on an object. Therefore, it is desirable that these pieces of information are distinguished from each other in the object recognition technique using two-dimensional scan as well. If such a distinction is made, an object will be more correctly recognized.

SUMMARY

Hence, it is desired to provide an object recognition apparatus and method using two-dimensional scan, which apparatus is able to determine whether or not detection results (measured-distance data) obtained by the reflections of transmission waves correspond to the reflections from the road surface.

As a first aspect of the disclosure, there is provided an apparatus for recognizing (or recognizing) presence of an object, the apparatus being mounted on a vehicle; the apparatus comprising: beam scanning means for scanning a beam-shaped electromagnetic wave toward a field of view outside the vehicle, the beam-shaped electromagnetic wave being transmitted repetitively at intervals two-dimensionally in both a width direction and a height direction of the vehicle, a reflected electromagnetic wave from the object being received; detecting means for detecting a reflection intensity of each of the transmitted electromagnetic waves and a distance between the apparatus and object based on a reception signal of the received of the electromagnetic wave, results detected by the detecting means showing detected reflection intensities and detected distance; characteristic obtaining means for obtaining, based on the results detected by the detecting means, characteristics presented by frequency distributions of the distance and intensity frequency distributions of the reception signal, respectively, in multiple rows in the height direction, the characteristics depending on an angle of the electromagnetic wave to a road on which the vehicle travels; and determining means for determining that the characteristics obtained by the characteristic obtaining means are obtained from the road when the characteristics meet a predetermined requirement.

Thus, according to the object recognition apparatus, focus is put on the characteristics indicated by the detection results of the multiple layers, i.e. distance frequency distribution and reflection intensity frequency distribution in the multiple layers, according to the angle of a road surface. Then, the detection results are processed to reliably make a determination as being of a road surface. In this way, an object can be accurately recognized (or estimated) based on reception signals.

Beams as transmission waves are sequentially emitted along a scan direction that is a heightwise direction of the multiple layers. In the case of a climbing lane as a road surface, in particular, measured-distance data obtained from the reflected waves of the beams as transmission waves are different from each other. Therefore, reception signals of a reflected wave from a climbing lane (an upward slope) are likely to be erroneously detected as being signals from a three-dimensional object. In this regard, reception signals from a climbing lane can be reliably determined as being data corresponding to the reflections from the road surface of a climbing lane.

In this way, even when an object is a climbing lane, which is not a horizontal road surface, accurate object recognition can be performed based on reception signals.

A preferred example will be explained for "determining detection results as being of a road surface".

As a second aspect of the disclosure, there is provided an apparatus for recognizing presence of an object, the apparatus being mounted on a vehicle; the apparatus comprising: beam scanning means for scanning a beam-shaped electromagnetic wave toward a field of view outside the vehicle, the beam-shaped electromagnetic wave being transmitted repetitively at intervals two-dimensionally in both a width direction and a height direction of the vehicle, a reflected electromagnetic wave from the object being received; detecting means for detecting a reflection intensity of each of the transmitted electromagnetic waves and a distance between the apparatus and object based on a reception signal of the received electromagnetic wave, results detected by the detecting means showing detected reflection intensities and detected distance; first determining means for determining whether or not a search area defined by a position showing a result specified among a plurality of results detected by the detecting means includes a further result among the results; producing means for producing the target by combining the plurality of results which allows the apparatus to recognize the object using the produced target when it is determined that the reference search area includes the further result; second determining means for determining that the detected results are obtained from the road when the detected results meet both of first and second requirements. The first requirement is that there are no detected results of further layers in the search area when the multiple layers of the field of view in the height direction are scanned, thereby showing that the target is a non-cubic target.

When multiple-layer scan is performed in the heightwise direction of the vehicle, the detection results of a three-dimensional object, if any, will appear in each of the multiple layers as an identical three-dimensional object. On the other hand, in the case of a non-three-dimensional object, the detection results of different layers will not appear in a search area.

In the second aspect, the second requirement is that, based on the detected results in scanning a predetermined layer in the height direction, i) first frequency distributions are obtained every range of a predetermined distance, and the first frequency distributions show that the detected results include a result exceeding a first threshold, the first threshold being set depending on the distance and corresponding to a lowest value of the distance frequency which is estimated to be generated by the detected result from reflection on the road, and ii) second frequency distributions are obtained every range of a predetermined reflection intensity range, and the second frequency distributions show that the detected results include a result exceeding a second threshold, the second threshold being set depending on the reflection intensity and corresponding to a lowest value of the reflection intensity frequency which is estimated to be generated by the detected result from reflection on the road is estimated to be generated The detection results, after being determined as being of a road surface, may have various usages. One of the usages may be as follows.

The apparatus further comprises deleting means for deleting the detected results determined by the second determining means; and recognizing means for recognizing the object based on detected results that remain without being deleted by the deleting means.

Thus, an obstacle, such as a preceding vehicle, in the forward direction is appropriately recognized without making erroneous recognition due to the detection results obtained from a road surface.

The first and second thresholds in the second requirement are set using a width of the road as a benchmark.

For example, if a threshold is set assuming a road width to be about 6 m, the threshold can be set to a relatively large value. Thus, the detection results are unlikely to be erroneously determined when an object is anything other than a road, e.g. when an automobile of about 5-meter long passes over in the forward direction.

A preferred example for "determining detection results as being from a climbing lane, in particular, as a road surface" will be explained. Hereinafter, when a term "road surface" is used, the term refers to a substantially horizontal road surface. Also, as far as a sloping road is a part of a road surface, the sloping road is referred to as a "climbing lane (upstream slope)".

As a third aspect of the disclosure, in addition to the beam scanning means, detecting means, first determining means, and producing means, the apparatus provides second determining means for determining that the detected results are obtained from the road when the detected results meet both of first and third requirements. The first requirement is that there are no detected results of further layers in the search area when the multiple layers of the field of view in the height direction are scanned, thereby showing that the object is a non-cubic object. The third requirement is that, based on the detected results in scanning a plurality of layers in the height direction, i) first frequency distributions are obtained every range of a predetermined distance in each of the layers, and the first frequency distributions show that the detected results include a result exceeding a first threshold, the first threshold being set depending on the distance and corresponding to a lowest value of the distance frequency which is estimated to be generated by the detected result from reflection on the road which is a climbing lane and distance ranges in which the detected results exceeding the third threshold are set based on a range of slope angles which are estimated to be the claiming lane, and ii) third frequency distributions are obtained every range of a predetermined reflection intensity range, and the third frequency distributions show that the detected results include a result exceeding a third threshold, the third threshold being set depending on the reflection intensity and corresponding to a lowest value of the reflection intensity frequency which is estimated to be generated by the detected result from reflection on the climbing lane is estimated to be generated.

The detection results, after being determined as being from a climbing lane, may have various usages. One of the usages may be as follows.

The apparatus further comprises deleting means for deleting the detected results determined by the second determining means; and recognizing means for recognizing the object based on detected results that remain without being deleted by the deleting means.

Thus, an obstacle, such as a preceding vehicle, is appropriately recognized without causing erroneous recognition due to the detection results corresponding to the reflections from a climbing lane.

It is preferred that the third threshold in the third requirement is set using a width of the road as a benchmark.

For example, if a threshold is set assuming a road width to be about 2 m, the threshold can be set to a relatively large value. Thus, it is unlikely that an erroneous determination is made on detection results obtained from anything other than a road.

It is also preferred that the distance ranges in which the detected results exceeding the third threshold are set based on both a range of slope angles estimated as the climbing lane and a spread angle of the beam-shaped electromagnetic wave in the height direction. Thus, a corresponding distance range can be more appropriately set.

The foregoing first to third aspects of the disclosure can also be practiced as a method of recognizing objects which pre present outside the vehicle.

BRIEF DESCRIPTION OF THE DRAWINGS

In the accompanying drawings:

FIGS. 5A to 5C are explanatory diagrams illustrating a process of determining a three-dimensional object and a non-three-dimensional object according to the embodiment;

DETAILED DESCRIPTION OF THE PREFERRED EMBODIMENTS

With reference to the accompanying drawings, hereinafter will be described an embodiment of the present invention.

Figure 1:
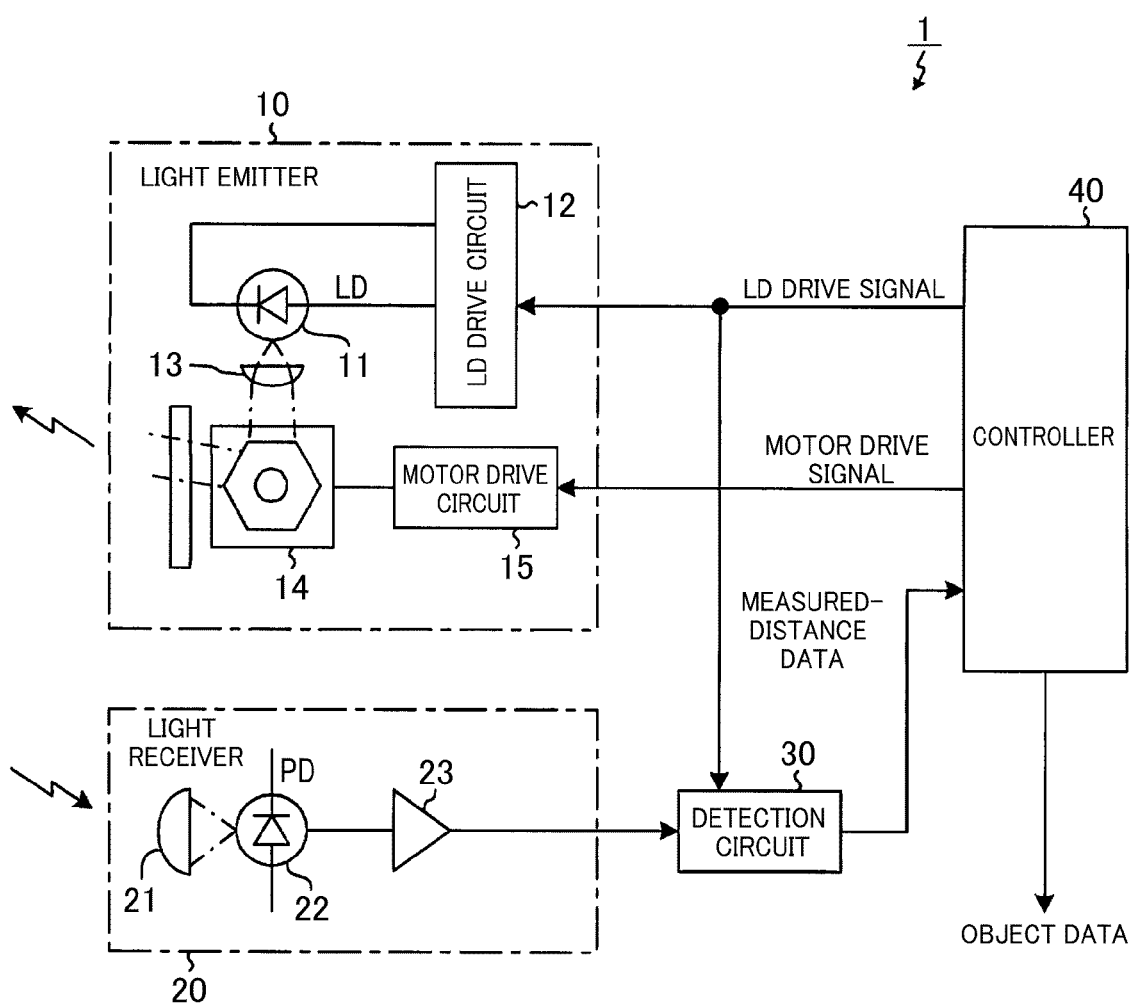
FIG. 1 is a schematic diagram illustrating an embodiment of a general configuration of an object recognition apparatus to which the present invention is applied.

FIG. 1 is a schematic diagram illustrating a general configuration of an object recognition apparatus 1 to which the present invention is applied.

The object recognition apparatus 1 is installed in a vehicle to recognize (or estimate, detect) an object residing in the forward direction of the vehicle and to generate object data consisting of information (location, size, etc.) associated with the object. The object data generated by the object recognition apparatus 1 is supplied to a vehicle control unit (not shown). The supplied object data is used, for example, for alarm control or so-called inter-vehicle control. Under the alarm control, an alarm is raised if a candidate object is an obstacle residing in a preset alarm area. Under the inter-vehicle control, if a candidate object is a preceding vehicle, the brake, the throttle, the transmission, and the like are actuated according to the state of the preceding vehicle to thereby control the vehicle speed concerned.

As shown in FIG. 1, the object recognition apparatus 1 includes a light emitter 10, a light receiver 20, a detection circuit 30 and a controller 40. The light emitter 10 emits laser beams to scan the forward direction of the vehicle. The light receiver 20 receives light reflected from an object to which the laser beams have been emitted from the light emitter 10. The detection circuit 30 measures time from when a laser beam is emitted from the light emitter 10 until when the reflected light is received by the light receiver 20, followed by outputting a distance data. The controller 40 outputs a signal for driving the light emitter 10, while inputting measured-distance data from the detection circuit 30 to generate object data based on the input/output signals, the object data being associated with an object from which the laser beams have been reflected.

Of these components, the light emitter 10 includes a laser diode (LD) 11, an LD drive circuit 12, light-emitting lens 13, a scanner 14 and a monitor drive circuit 15. The LD 11 emits laser beams. The LD drive circuit 12 allows the LD 11 to generate a pulsed laser beam as a transmission wave according to an LD drive signal from the controller 40. The light-emitting lens 13 narrows the width of the laser beam caused by the LD 11. The scanner 14 is configured by a polygon mirror rotatably and pivotally supported to reflect laser beams supplied via the light-emitting lens 13, and a motor for rotating and actuating the polygon mirror. The motor drive circuit 15 drives the motor configuring the scanner 14 according to a motor drive signal from the controller 40 to rotate the polygon mirror to change of the emission direction of a laser beam, so that scanning with the laser beam is realized within a preset angular range.

The polygon mirror of the present embodiment has a substantially six-sided truncated pyramidal shape, with six sides forming a mirror. Since the six sides have a different slant angle with respect to the bottom surface, the polygon mirror is able to discontinuously sweep and emit laser beams within a predetermined angular range in the widthwise direction (horizontal direction) and heightwise direction (vertical direction) of the vehicle.

Specifically, scanning with the beams in the widthwise direction of the vehicle (horizontal beams) is ensured to be performed in a scan area of a predetermined angular range in the widthwise direction of the vehicle (hereinafter also just referred to as "widthwise direction"), centering on the front direction of the vehicle. Laser beams are ensured to be emitted for a predetermined number of times in the scan area, being spaced apart from each other by an interval equal to the specified beam width of the horizontal beams. The horizontal beams scan the scan area from the left to the right. The horizontal beams are distinguished from each other being allocated with respective beam numbers.

On the other hand, regarding the heightwise direction of the vehicle (hereinafter also just referred to as "heightwise direction"), three-layer scan is performed in the present embodiment using three sides of the polygon mirror. Naming the three layers as layer 1, layer 2 and layer 3 from the top, the uppermost layer 1 is scanned in the widthwise direction, the middle layer 2 is similarly scanned in the widthwise direction, and the lowermost layer 3 is again similarly scanned in the widthwise direction.

In this way, laser beams are permitted to scan over the scan area in a two-dimensional manner. Referring to FIG. 2 and FIGS. 3A to 3C, hereinafter is explained a scan pattern of the two-dimensional scan.

Figure 2:
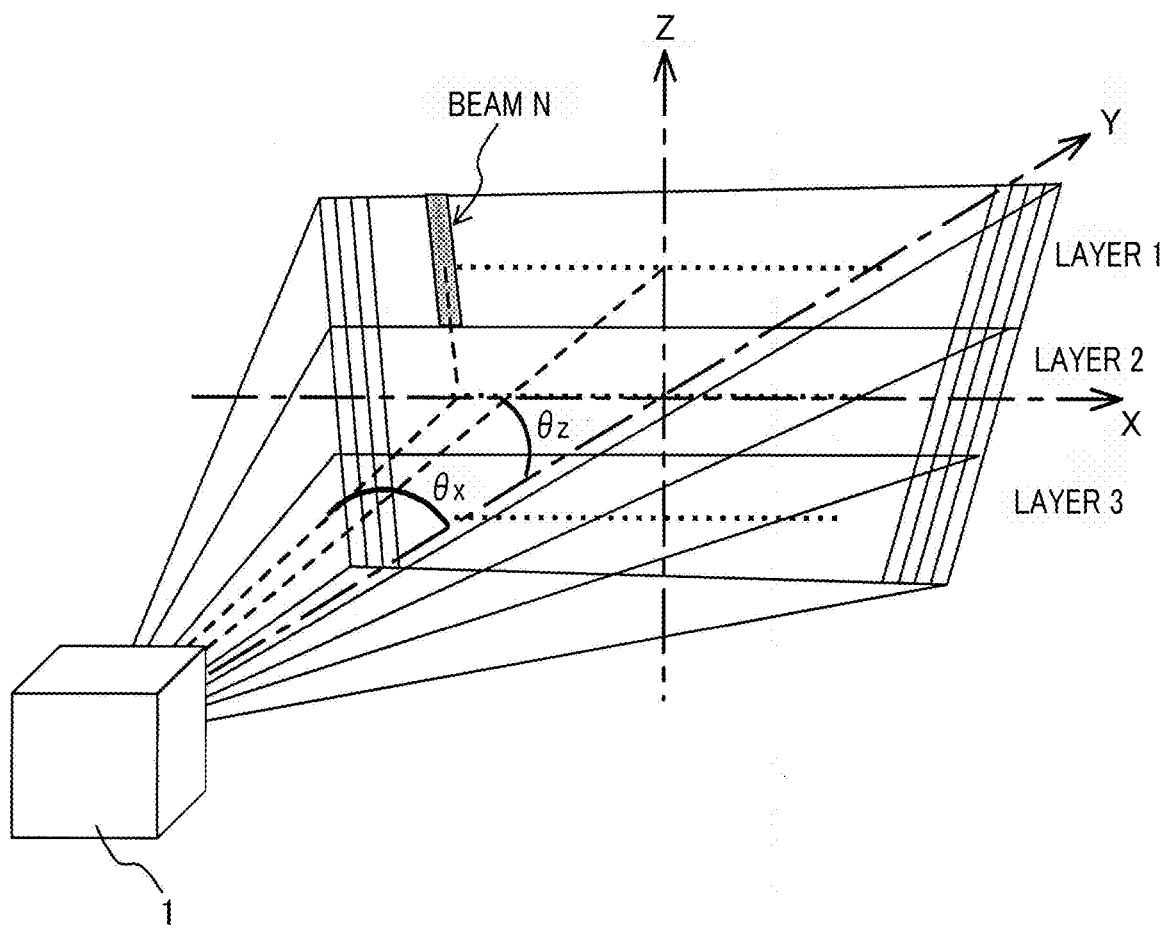
FIG. 2 is a schematic perspective diagram illustrating a scan pattern of laser beams according to the embodiment.

FIG. 2 is a schematic perspective diagram illustrating a two-dimensional scan pattern. Although FIG. 2 shows a rectangular pattern as a pattern of emitted laser beams, the shape of a pattern is not limited to this rectangular shape but may, for example, be an elliptical shape or a substantially circular shape.

Figure 3A:
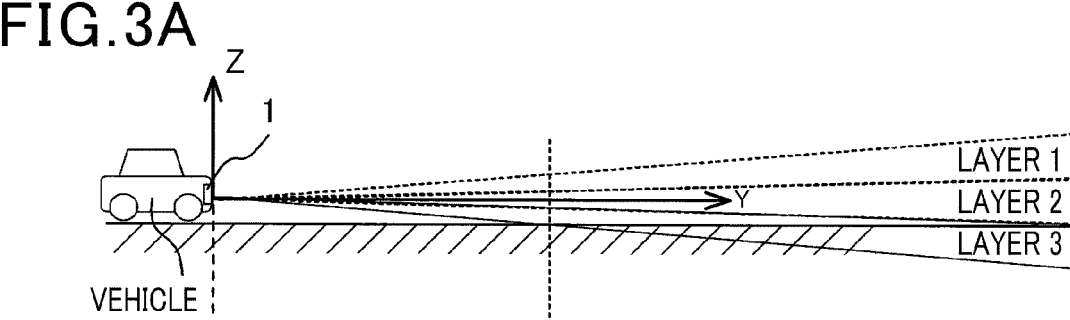
FIGS. 3A to 3C are schematic diagrams illustrating emission extent of laser beams according to the embodiment.
Figure 3B:
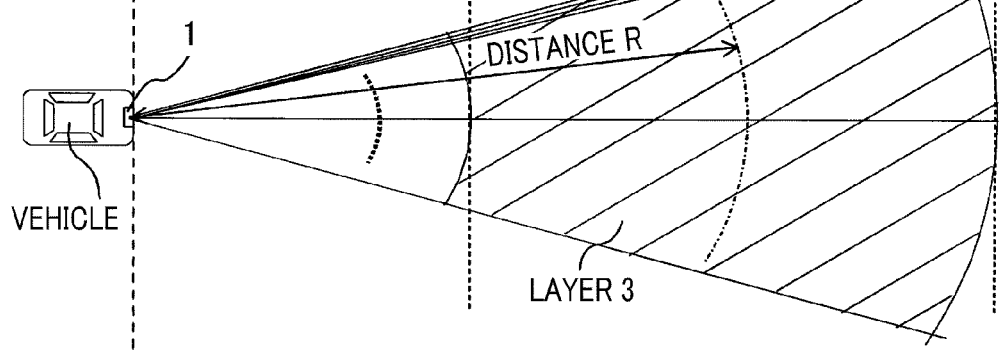
Figure 3C:
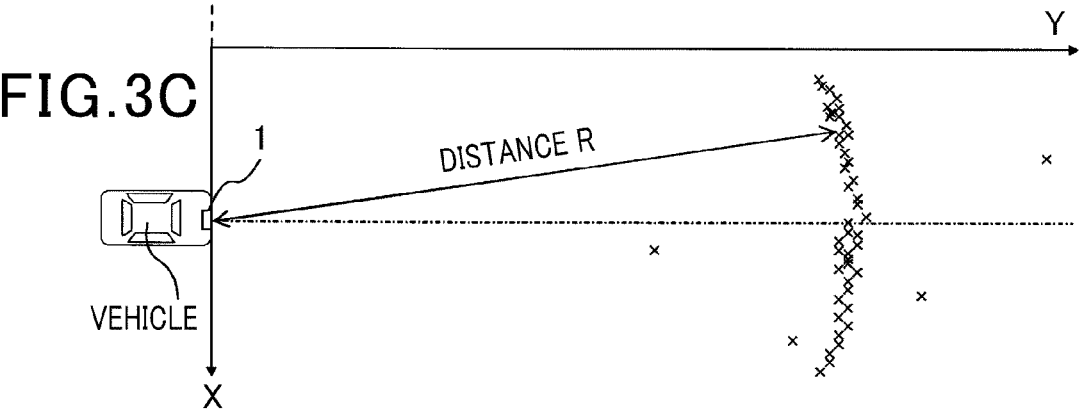

FIGS. 3A to 3C are schematic diagrams illustrating emission extent of laser beams. As shown in FIGS. 3A to 3C, the object recognition apparatus 1 is disposed near the center of the front end of a vehicle. FIG. 3A is a schematic diagram illustrating the scan pattern from a lateral side of the vehicle concerned. FIG. 3B is a schematic diagram illustrating the scan pattern from above the vehicle concerned. FIG. 3C is an explanatory diagram illustrating distances R measured in the state shown in FIG. 3B.

In FIG. 2, the direction toward the center of a measurement area (normally, this direction is often permitted to coincide with the front direction (longitudinal direction) of the vehicle) is a Y axis, the widthwise direction is an X axis and the heightwise direction is a Z axis. A predetermined area defined in an X-Z plane perpendicular to the Y axis is sequentially scanned. The direction of the scan is from the left to the right in FIG. 2 regarding the widthwise direction that is an X-axis direction, and from the top to the bottom in FIG. 2 regarding the heightwise direction that is a Z-axis direction.

Performing such two-dimensional scan, scan angles $\theta x$ and $\theta z$ indicating scan directions are obtained together with the measured distances R. The term "distance R" refers to the distance between an object (vehicle, roadside object, road surface, etc.) to which laser beams are emitted and the object recognition apparatus 1.

The two scan angles $\theta x$ and $\theta z$ are explained. The angle between an emitted laser beam and an X-Y plane is defined to be a vertical scan angle which is represented by $\theta z$, while the angle between a line that is a projection of an emitted laser beam on an X-Y plane and the Y axis is defined to be a horizontal scan angle which is represented by $\theta x$.

The light receiver 20 includes a light-receiving lens 21, a light-receiving element 22 and an amplifier 23. The light-receiving lens 21 collects reflected light from an object that has reflected a laser beam (horizontal beam). The light-receiving element 22 receives reflected light via the light-receiving lens 21 and generates a light-receiving signal having a voltage value equivalent to the intensity of the received reflected light (reflection intensity). The amplifier 23 amplifies the light-receiving signal generated by the light-receiving element 22.

The detection circuit 30 is configured to detect a round-trip time of a laser beam on the basis of the LD drive signal from the controller 40 and the output signal from the amplifier 23. The detection circuit 30 is then ensured to output the detected round-trip time as a distance data to the controller 40 together with the corresponding scan angles (vertical and horizontal scan angles $\theta z$ and $\theta x$ mentioned above).

The controller 40 is a well-known microcomputer that includes a CPU, a ROM and a RAM. The ROM stores, for example, a program of a process (described later) performed by the CPU.

The controller 40 performs at least a scan process and an object recognition process. In the scan process, the light-emitter 10 is driven by the LD drive signal and the motor drive signal to scan the scan area. In the object recognition process, object data associated with an object that has reflected laser beams is generated based on measured-distance data, i.e. detection results, obtained from the scan.

Of these processes, the scan process is started at every preset scan cycle (100 ms). In the process, the LD drive signal is outputted at regular intervals for a predetermined number of times. Synchronizing with this, the motor drive signal for driving the scanner 14 is outputted so that the emission direction of laser beams is shifted on a predetermined angle basis. As mentioned above, two-dimensional scanning is carried out by performing three-layer scanning using three sides of the polygon mirror.

Figure 4:
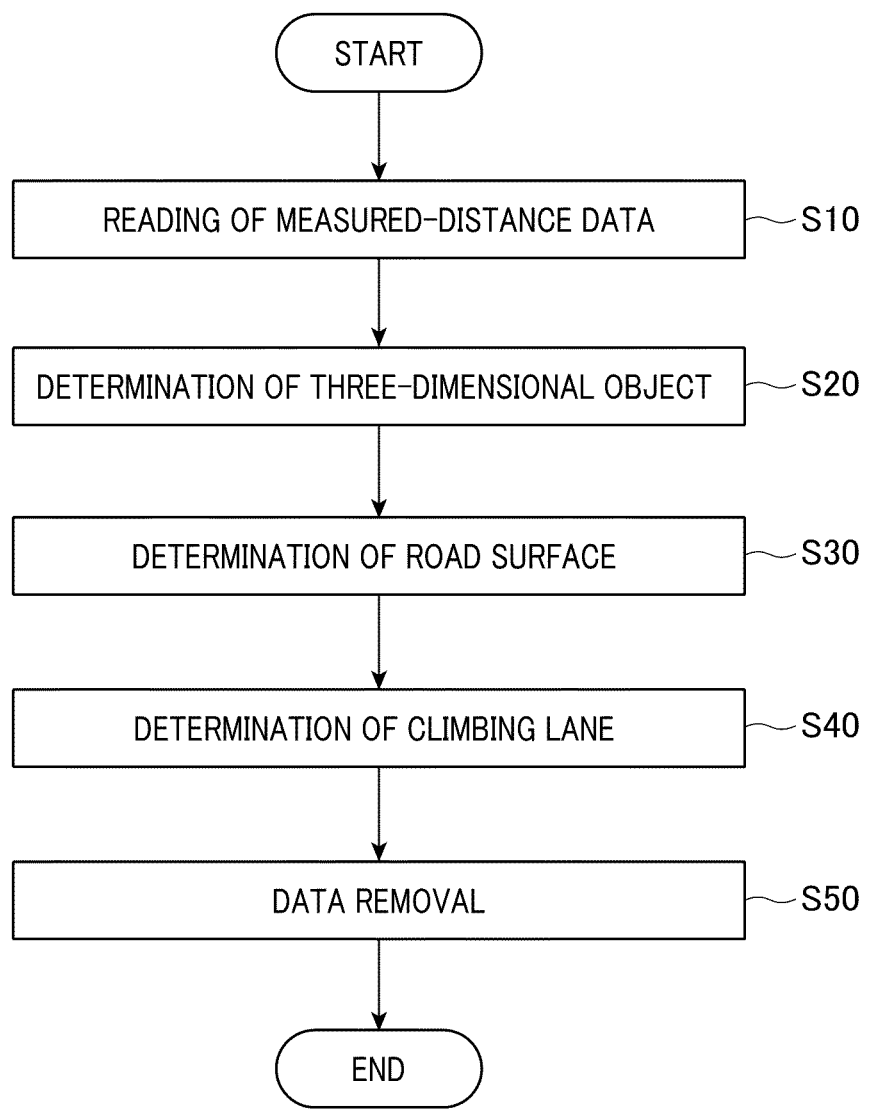
FIG. 4 is a flow diagram illustrating a process (preprocessing) of determining and removing measured-distance data that correspond to the reflections from a road surface and a climbing lane according to the embodiment.

On the other hand, the object recognition process is started every time the scan process is completed. FIG. 4 is a flow diagram illustrating a process (preprocessing) of determining and removing measured-distance data that correspond to the reflections from a road surface and a climbing lane. Specifically, the preprocessing shown in the flow diagram of FIG. 4 is performed to determine and remove measured-distance data of an object which should not be an object to be recognized.

More specifically, in the preprocessing of the object recognition process, at step S10, measured-distance data corresponding to one scan are read out, first, from the detection circuit 30. The measured-distance data corresponding to one scan are the data obtained by performing two-dimensional scan, i.e. the three-layer scan, using three sides of the polygon mirror. The measured-distance data of each of the layers 1, 2 and 3 are distinguished from the measured-distance data of other layers by defining the vertical san angle $\theta z$.

At step S20, a three-dimensional object determination process is performed. Specifically, at step S20, it is determined whether a distance data has been caused by the reflection from a three-dimensional object or by the reflection from a non-three-dimensional object. More specific description will be provided later.

At step 30, a road surface determination process is performed. Specifically, at step 30, it is determined whether or not a distance data has been caused by the reflection from a road surface. More specific description will be provided later.

At step 40, a climbing lane determination process is performed. Specifically, at step 40, it is determined whether or not a distance data has been caused by the reflection from a climbing lane. More specific description will be provided later.

At step S50, measured-distance data to be removed are determined and removed, based on the results of the determination processes for a three-dimensional object at step S20, for a road surface at step S30 and for a climbing lane at step S40.

After removing unnecessary data by performing the preprocessing described above, a well-known object recognition process is performed. As disclosed in JP-A-2002-131433, for example, the well-known object recognition process includes generating data of a target area (target area data) based on measured-distance data, calculating a center position (X, Y) and a size (W, D) of an object based on the target area data, and calculating a relative speed (Vx, Vy) of a moving object, such as a preceding vehicle, with reference to the position of the vehicle concerned based on temporal change of the center position (X, Y).

In generating the target area data based on the measured-distance data, if predetermined conditions between the measured-distance data based on a range $\Delta X$ in the X-axis direction and a range $\Delta Y$ in the Y-axis direction are met, the point sets are integrated to generate the target area data. A target is a rectangular area which is set to a size that includes the integrated point sets. The target area data includes a central coordinate (X, Y) of the area and data on two sides (W (width), D (depth)) representing the size of the area.

The object data generated by the object recognition apparatus 1 in this way is supplied to the vehicle control unit (not shown) as described above. If the object is an obstacle residing in an alarm area, the object data is used for the alarm control to raise an alarm. If the object is a preceding vehicle, the object data is used for the so-called inter-vehicle control to control the speed of the vehicle concerned according to the state of the preceding vehicle.

Hereinafter are sequentially described the determination processes for a three-dimensional object at step S20, for a road surface at step S30 and for a climbing lane at step S40, and each processing of data removal at step S50.

Referring to FIGS. 5A to 5C, the three-dimensional object determination process is described. FIGS. 5A to 5C are explanatory diagrams illustrating a process of determining a three-dimensional object and a non-three-dimensional object. Specifically, FIG. 5A is a diagram, as a bird's-eye view, illustrating an X-Y coordinate. FIG. 5B is a diagram illustrating an example of how measured-distance data appear on the X-Y coordinate regarding a three-dimensional object and a non-three-dimensional object. FIG. 5C is a diagram illustrating how measured-distance data appear on the X-Y coordinate regarding a typical road structure (specifically including vehicles, a road surface and white lines).

As shown in FIG. 5A, a distance data in the layer 1 is indicated by a filled circle, a distance data in the layer 2 is indicated by a double circle and a distance data in the layer 3 is indicated by a single circle. The same applies to FIGS. 5B and 5C.

Each elliptic area indicated by a broken line in FIG. 5B is an area (search area) centered on the measured-distance data to be paid attention and having a probability that the measured-distance data of an identical object reside in different layers. In providing the area, distance-measurement time differences and measurement errors between the layers, as well as ranges for determining whether the measured-distance data are of an identical object, are taken into account. Also, the area may be the search area used for the integration of the point sets in generating target area data based on measured-distance data. Although an elliptic shape is used in the present embodiment, a circular or rectangular shape may be used instead.

In the elliptic search area of the present embodiment, the size in the X-axis direction (widthwise direction) is made relatively small, and the size in the Y-axis direction (longitudinal direction) is made relatively large taking account of the distance-measurement time differences between layers. This is because, in the case of a three-dimensional object, measured-distance data of an identical object may also reside in different layers and thus because the area is required to be set as an area including the measured-distance data of a plurality of layers.

FIG. 5B shows an example of measured-distance data of a three-dimensional object and measured-distance data of a non-three-dimensional object. If an object is a three-dimensional object, there is a probability that the measured-distance data of different layers reside in the same search area. On the other hand, if an object is a non-three-dimensional object, the measured-distance data of different layers do not reside in the same search area.

In this way, a requirement 1 is provided as follows.
(Requirement 1)
A condition is set that the measured-distance data of different layers should not reside in the same search area. If this condition is met, the measured-distance data are determined to be of a non-three-dimensional object.

Referring to FIG. 5C, a specific example is explained. For example, when an object is a vehicle (preceding vehicle), measured-distance data over a plurality of layers will reside in the same search area and thus the object is determined to be a three-dimensional object. When an object is a road surface, measured-distance data of the same layer will be juxtaposed in the X-axis direction in the same search area and thus the object is determined to be a non-three-dimensional object. When an object is a white line, measured-distance data of the same layer will be juxtaposed in the Y-axis direction in the same search area and thus the object is determined to be a non-three-dimensional object.

Figure 6A:
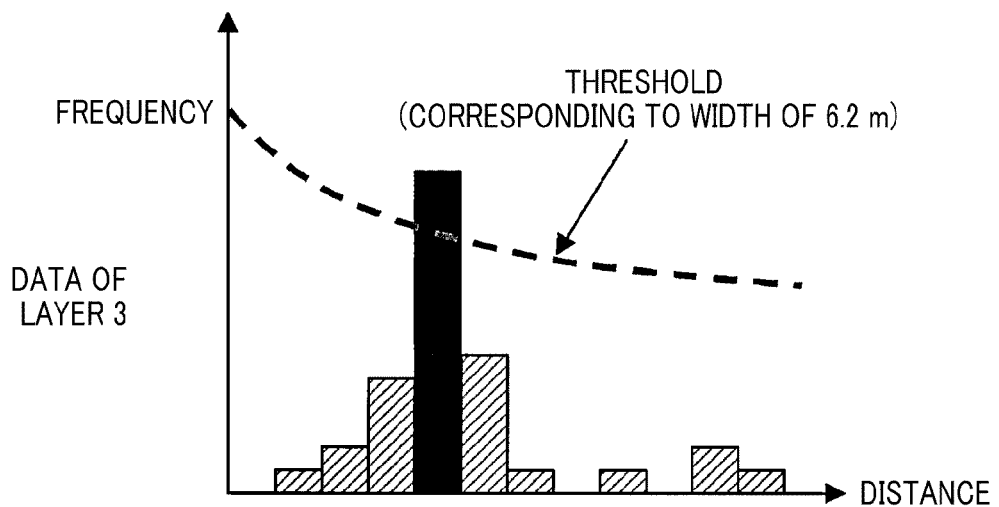
FIGS. 6A and 6B are explanatory diagrams illustrating a process of determining a distance data as being the reflection from a road surface according to the embodiment.
Figure 6B:
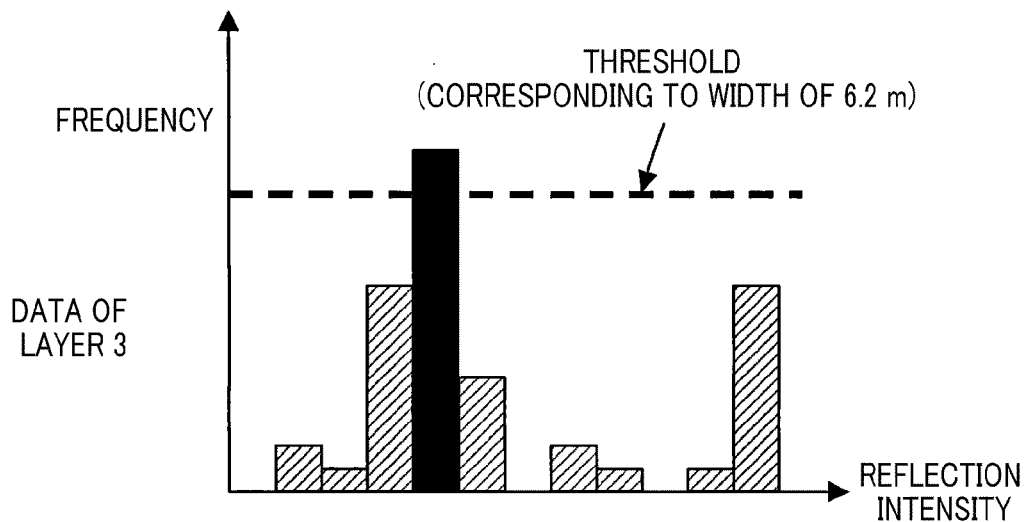

Referring to FIGS. 6A and 6B, the road surface determination process is explained. FIGS. 6A and 6B are explanatory diagrams illustrating a process of determining a distance data as being the reflection from a road surface.

Let us discuss, first, the data characteristics of a road surface from the viewpoint of distance and reflection intensity. It should be appreciated that when a term "distance" is used here, the term refers to a distance indicated by a distance data that is the reflection from a road surface. As a rule, the term "distance" corresponds to a distance in the depthwise direction up to a center position of an emission plane in the case where beams are emitted onto a road surface.

In FIG. 3B, the diagonally shaded area corresponds to the emission plane in the case where beams are emitted onto a road surface. Thus, the distance R of each distance data of FIG. 3B approximately corresponds to a distance in the depthwise direction up to the center position of the emission plane.

FIG. 6A is a distance histogram indicating the number of data for each predetermined distance range regarding the measured-distance data in the layer 3, with the horizontal axis indicating distance and the vertical axis indicating frequency.

A threshold of frequency that would be caused by the distance data corresponding to a reflection from a road surface is set. The threshold is set assuming a "certain width". A characteristic of the measured-distance data corresponding to the reflections from a road surface is that the measured-distance data are concentrated on substantially the same distance if there is no three-dimensional object. Meanwhile, measured-distance data are also concentrated on substantially the same distance if a vehicle passes over in the forward direction. Therefore, a distance data corresponding to the reflection from a road surface should not desirably be erroneously determined to be of a vehicle. Thus, for example, the width corresponding to the width of an ordinary double-lane road is set as the "certain width". Alternatively, the longitudinal length of a vehicle plus a tolerance a is set as the "certain width". In this way, the width is set to a value with which a datum can be determined to correspond to a reflection from a road surface without involving erroneous determination as being a vehicle.

In FIGS. 6A and 6B, the width is set in the manner of the latter case. Specifically, for example, the upper limit of the longitudinal length of a vehicle is set to 5 m which is added with 1.2 m as "+α" to use the resultant value of 6.2 m as the width. The threshold corresponding to this width is indicated by a broken line in FIG. 6A. If any frequency exceeds the threshold, the distance data involved has a high probability of corresponding to the reflection from a road surface.

FIG. 6B is a reflection intensity histogram indicating the number of data for each predetermined reflection intensity range regarding the measured-distance data in the layer 3 again, with the horizontal axis indicating reflection intensity and the vertical axis indicating frequency.

Here, again, "a threshold of frequency that would be caused by a distance data corresponding to the reflection from a road surface" is set, assuming the case of the "certain width=6.2 m" as explained referring to FIG. 6A. If any frequency exceeds the threshold, the distance data having the reflection intensity has a high probability of corresponding to the reflection from a road surface.

In this way, a requirement 2 is provided as follows.

(Requirement 2)

A condition is set that the frequency of a distance data should exceed the threshold of the histogram and the threshold of the reflection intensity histogram. If this condition is met, the distance data is determined as having a high probability of corresponding to the reflection from a road surface.

Referring now to FIGS. 7A to 8B, the climbing lane determination process is explained.

Let us discuss, first, the data characteristics of a climbing road from the viewpoint of distance and reflection intensity. The term "distance" here refers to a distance indicated by a distance data that is a reflection from a climbing lane surface (=road surface of a climbing lane). As a rule, a detected "distance" corresponds to a distance in the depthwise direction up to a center position of an emission plane in the case where beams are emitted onto a road surface.

Figure 7A:
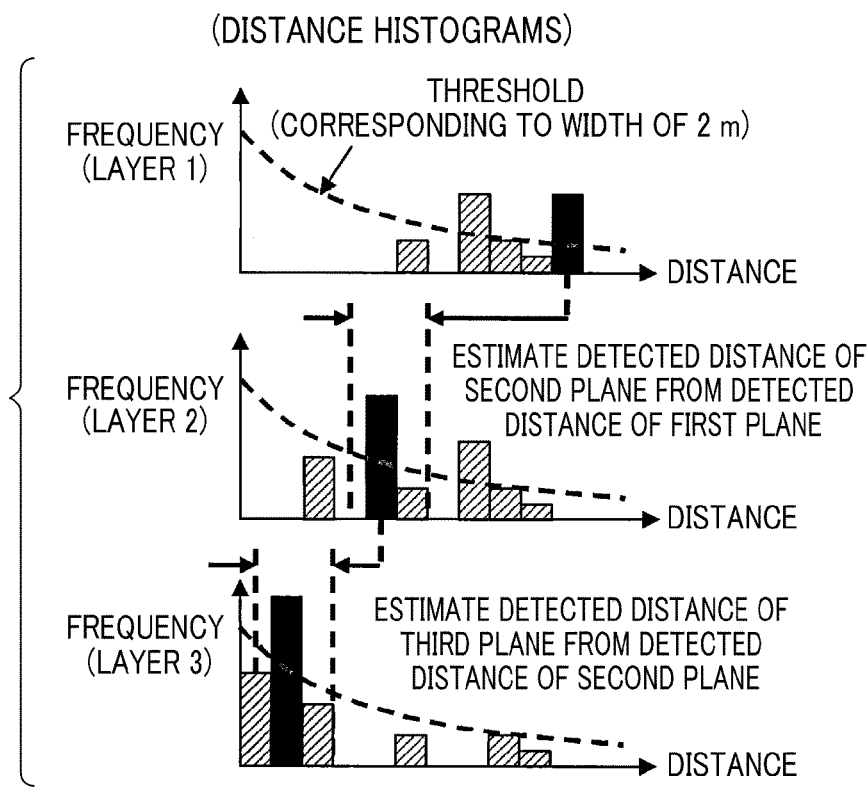
FIGS. 7A and 7B are explanatory diagrams illustrating a process of determining a distance data as being the reflection from a climbing lane according to the embodiment.

FIG. 7A shows distance histograms indicating the number of data for each predetermined distance range regarding the measured-distance data in the layers 1, 2 and 3, with each horizontal axis indicating distance and each vertical axis indicating frequency.

It is observed that, if a distance data is of a climbing lane surface, there should be corresponding data groups in the adjacently located layers among the layers 1, 2 and 3, the data groups indicating reflections which are characteristic of the reflections from a climbing lane surface. Specifically, it is determined whether each distance data corresponds to the reflection from a climbing lane surface, based on the characteristics shown between the histograms of the plurality of layers.

The threshold in this case is set to a value from a viewpoint of making the threshold larger than the width of a vehicle, assuming, for example, an object has a width of 2 m.

If there are data groups whose frequency exceeds the threshold in the corresponding distance ranges of adjacently located layers, the data groups are determined as being measured-distance data corresponding to the reflections from a climbing lane.

A corresponding distance range of each layer is estimated as follows. Specifically, the detected distance of the layer 1 (first plane) is used to estimate an extent assumed as a detected distance of the layer 2 (second plane). The detected distance of the layer 2 (second plane) is used to estimate an extent assumed as a detected distance of the layer 3 (third plane).

Figure 8A:
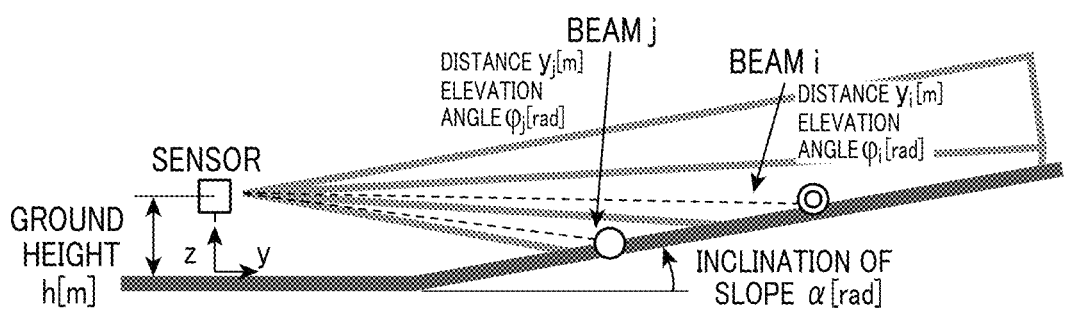
FIGS. 8A and 8B are explanatory diagrams illustrating a process of determining a distance data as being the reflection from a climbing lane according to the embodiment.
Figure 8B:
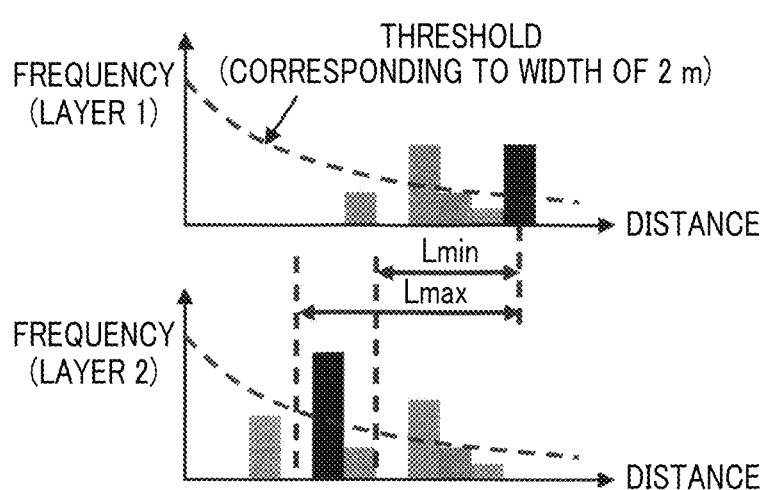

Explanation is given in this regard referring to FIGS. 8A and 8B. FIGS. 8A and 8B are explanatory diagrams illustrating a process of determining a distance data as being a reflection from a climbing lane.

FIG. 8A shows beam distances relative to the layers. Let us assume the case where a beam as a transmission wave is emitted from the object recognition apparatus 1 (laser radar sensor) set at a ground height h [m] toward a slope having an inclination α [rad]. In this case, regarding the distance data of beam i, the distance is designated as $y_i$ [m] and the elevation angle as $\phi_i$ [rad]. Regarding the distance data of beam j of the layer which is one layer below the beam i, the distance is designated as $y_j$ [m] and the elevation angle as $\phi_j$ [rad].

In this case, an equation of a slope based on the distance data of the beam i is expressed by the following Formula (1):

$$z = \tan \alpha (y - y_i) + (y_i \tan \phi_i + h) \qquad (1)$$

Further, an equation of a line segment connecting the sensor and a measurement point of the beam j on the slope is expressed by the following Formula (2):

$$z = \tan \phi_j y + h \qquad (2)$$

From Formulas (1) and (2), the distance y, regarding the distance data of the beam j is expressed by the following Formula (3):

$$y_j = [(\tan \phi_i - \tan \alpha)/(\tan \phi_j - \tan \alpha)] y_i \qquad (3)$$

This is a relational equation of the beam distances in the adjacently located layers.

FIG. 8B shows a distance range where corresponding measured-distance data are expected to be present between layers. For example, if a data group exceeding the threshold is present in the layer 1, a distance to a minimally distanced corresponding distance data is designated as Lmin, and a distance to a maximally distanced corresponding distance data is designated as Lmax, with reference to the distance of the data group. The distance Lmax is subtracted from the distance of the data group of the layer 1 to obtain a distance. The distance Lmin is subtracted from the distance of the data group of the layer 1 to obtain a distance. The difference between the obtained distances is the extent where corresponding measured-distance data are expected to be present in the layer 2.

The distances Lmin and Lmax used for determining the extent are set as follows. Specifically, for example, the angle of inclination of a climbing lane in the forward direction is assumed to be 1 to 10 [deg]. The distances Lmin and Lmax are set based on the assumed angle of inclination and a spread angle (e.g., 1.2 [deg]) in the heightwise direction (direction perpendicular to the width direction, i.e., the transverse direction) of an emitted beam.

Figure 7B:
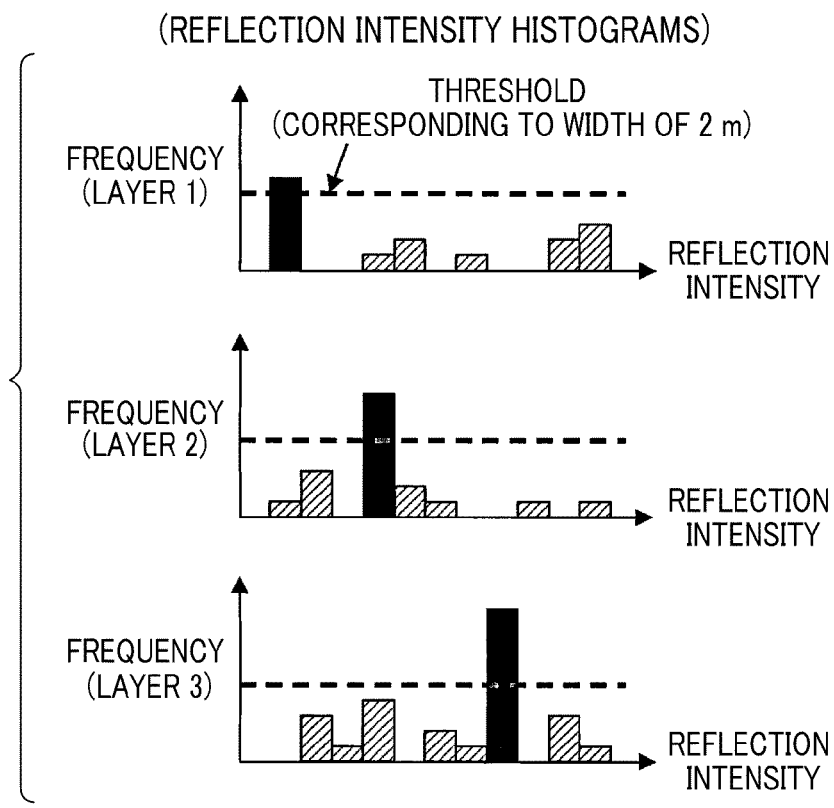

FIG. 7B shows reflection intensity histograms indicating the number of data for each predetermined reflection intensity range regarding the measured-distance data in the layers 1, 2 and 3, with each horizontal axis indicating reflection intensity and each vertical axis indicating frequency.

The threshold in this case is set to a value from a viewpoint of making the threshold larger than the width of a vehicle, assuming, for example, an object has a width of 2 m. In the case of reflection data obtained from a climbing lane, there should be a distance data group in each of the layers 1, 2 and 3, having frequency exceeding the threshold.

In this way, a requirement 3 is provided as follows.

(Requirement 3)

A condition is set that data groups having a frequency exceeding a threshold should reside in the adjacently located layers among the layers 1, 2 and 3 in distance histograms and reflection intensity histograms. If this condition is met, the measured-distance data are determined as having a high probability of corresponding to the reflections from a climbing lane.

Figure 9A:
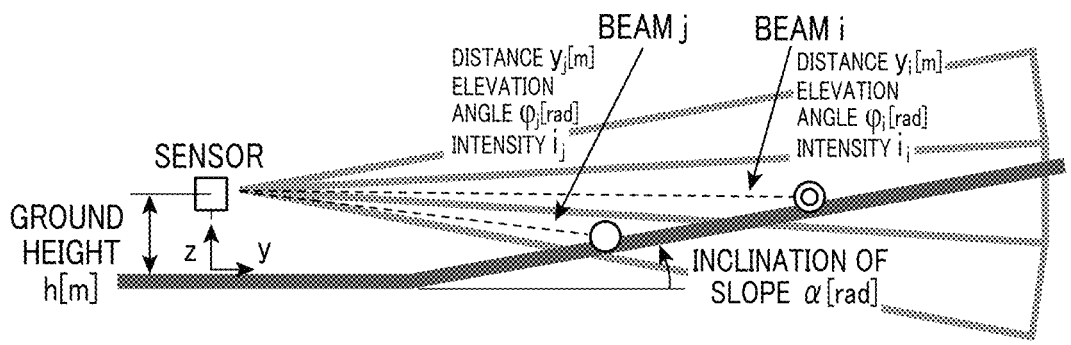
FIGS. 9A and 9B are explanatory diagrams illustrating a process of determining a distance data as being the reflection from a climbing lane according to the embodiment.
Figure 9B:
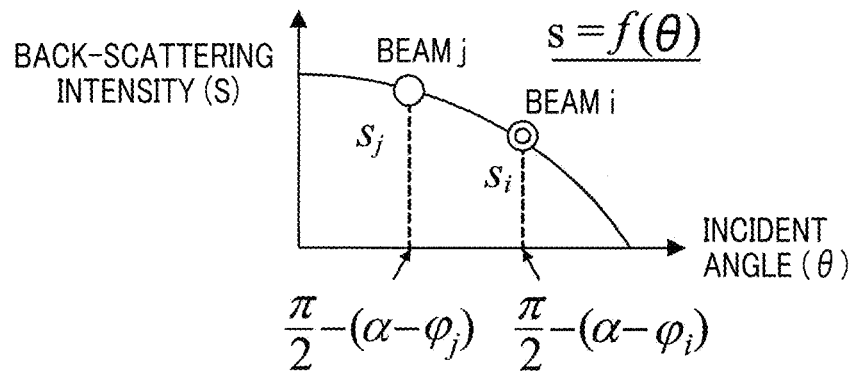

Referring now to FIGS. 9A and 9B, a relationship between layers regarding reflection intensity is additionally explained. FIGS. 9A and 9B are explanatory diagrams illustrating a process of determining a distance data as being a reflection from a climbing lane.

Let us assume the case where a beam as a transmission wave is emitted from the object recognition apparatus 1 (laser radar sensor) set at a ground height h [m] toward a slope having an inclination α [rad]. In this case, regarding the distance data of beam i, the distance is designated as $y_i$ [m], the elevation angle as $\phi_i$ and the reflection intensity as $i_i$. Regarding the distance data of beam j of the layer which is one layer below the beam i, the distance is designated as $y_j$ [m], the elevation angle as $\phi_j$ [rad] and the reflection intensity as $i_j$.

In this case, the reflection intensity $i_j$ of the distance data caused by the beam j is expressed by the following Formula (4):

$$i_j = [(s_j/s_i) \cdot (y_j/y_i)^n] i_i \qquad (4)$$

Regarding the distance $y_j$, Formula (3) set forth above is usable.

In Formula (4), the term $(s_j/s_i)$ represents a road surface scattering characteristic, while the term $(y_j/y_i)^n$ (n=2) represents road surface scattering. The components si and sj configuring the term of the road surface scattering characteristic are calculated based on a scattering characteristic model. However, empirical values derived from actual measurements may be used instead.

FIG. 9B is a graph indicating the scattering characteristic model that is a relationship between incident angle (θ) and back-scattering intensity (s). As can be seen from FIG. 9B, a larger incident angle makes the back-scattering intensity smaller.

When a certain layer is taken as an example, the adjacent layer one layer below the certain layer will have larger reflection intensity, as a rule, than that of the certain layer. As will be understood from FIG. 7B, the measured-distance data corresponding to the respective reflections from a climbing lane show that the reflection intensity tends to be gradually increased from the layer 1 to the layer 2 and from the layer 2 to the layer 3, as the layer level is shifted one layer below. Therefore, it looks that a data group having a frequency exceeding the threshold is moving rightward in the histograms.

Accordingly, if the state mentioned above is detected, the measured-distance data are more correctly determined as corresponding to the reflections from a climbing lane. In this case, it is required to grasp in which of reflection intensity ranges in the reflection intensity histograms of the layers 1, 2 and 3 corresponding data groups reside.

A data search procedure between layers may be performed as follows. Specifically, a distance between data groups which would be of a climbing lane is obtained from the histograms of FIG. 7A. Then, using the obtained distance and Formula (4) and based on the reflection intensity of a data group in a certain layer, the reflection intensity of a data group is estimated for the adjacently located layer in which the presence of a data group is to be searched, followed by searching in the vicinity of the estimated reflection intensity. Alternatively, data search may be carried out in a manner similar to the estimation of the distance range between layers of data groups using the distance histograms. Specifically, the term $(y_j/y_i)^n$ of Formula (4) may be extended. Then, using Formula (4) including the extended term $(y_j/y_i)^n$ and based on the reflection intensity of a data group in a certain layer, the reflection intensity range of a data group may be estimated for the adjacently located layer in which the presence of a data group is to be searched, followed by searching within the extent.

The measured-distance data to be removed are determined and removed, based on the results of the three-dimensional object determination at step S20, the road surface determination at step S30 and the climbing lane determination at step S40.

The requirements 1 to 3 are again provided below.

(Requirement 1)

If a condition is met that measured-distance data of different layers should not reside in the same search area, the measured-distance data are determined to be of a non-three-dimensional object.

(Requirement 2)

If a condition is met that the frequency of a distance data should exceed the threshold of the distance histogram and the threshold of the reflection intensity histogram, the distance data is determined as having a high probability of corresponding to the reflection from a road surface.

(Requirement 3)

If a condition is met that data groups having a frequency exceeding a threshold should reside in the adjacently located layers among the layers 1, 2 and 3 in distance histograms and reflection intensity histograms, the measured-distance data are determined as having a high probability of corresponding to the reflections from a climbing lane.

If a distance data meets both of Requirement 1 indicating that a distance data is from a non-three-dimensional object and Requirement 2 indicating that a distance data has a high probability of being from a road surface, the distance data is determined as being from a road surface and removed.

If a distance data meets both of Requirement 1 indicating that a distance data is from a non-three-dimensional object and Requirement 3 indicating that a distance data has a high probability of being from a climbing lane, the distance data is determined as being from a climbing lane and removed.

As described above, if both of Requirement 1 and Requirement 2 are met, the object recognition apparatus 1 determines the distance data corresponds to the reflection from a road surface and removes the distance data. If both of Requirement 1 and Requirement 3 are met, the object recognition apparatus 1 determines the distance data corresponds to the reflection from a climbing lane and removes the distance data.

Figure 10:
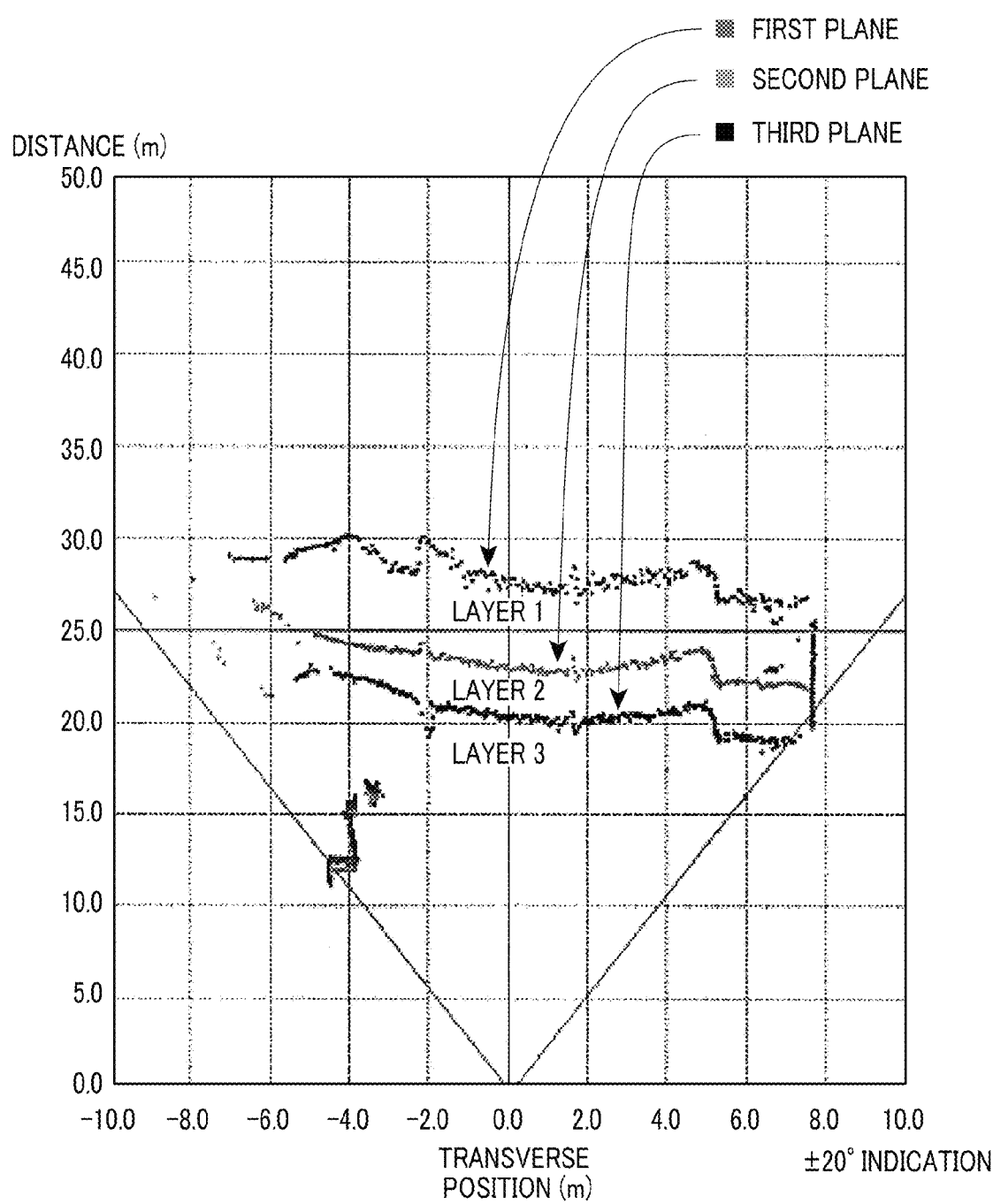
FIG. 10 is an explanatory diagram illustrating measured-distance data which are not applied with a process of determining reflected datum as being the reflection from a climbing lane and removing the distance data.
Figure 11:
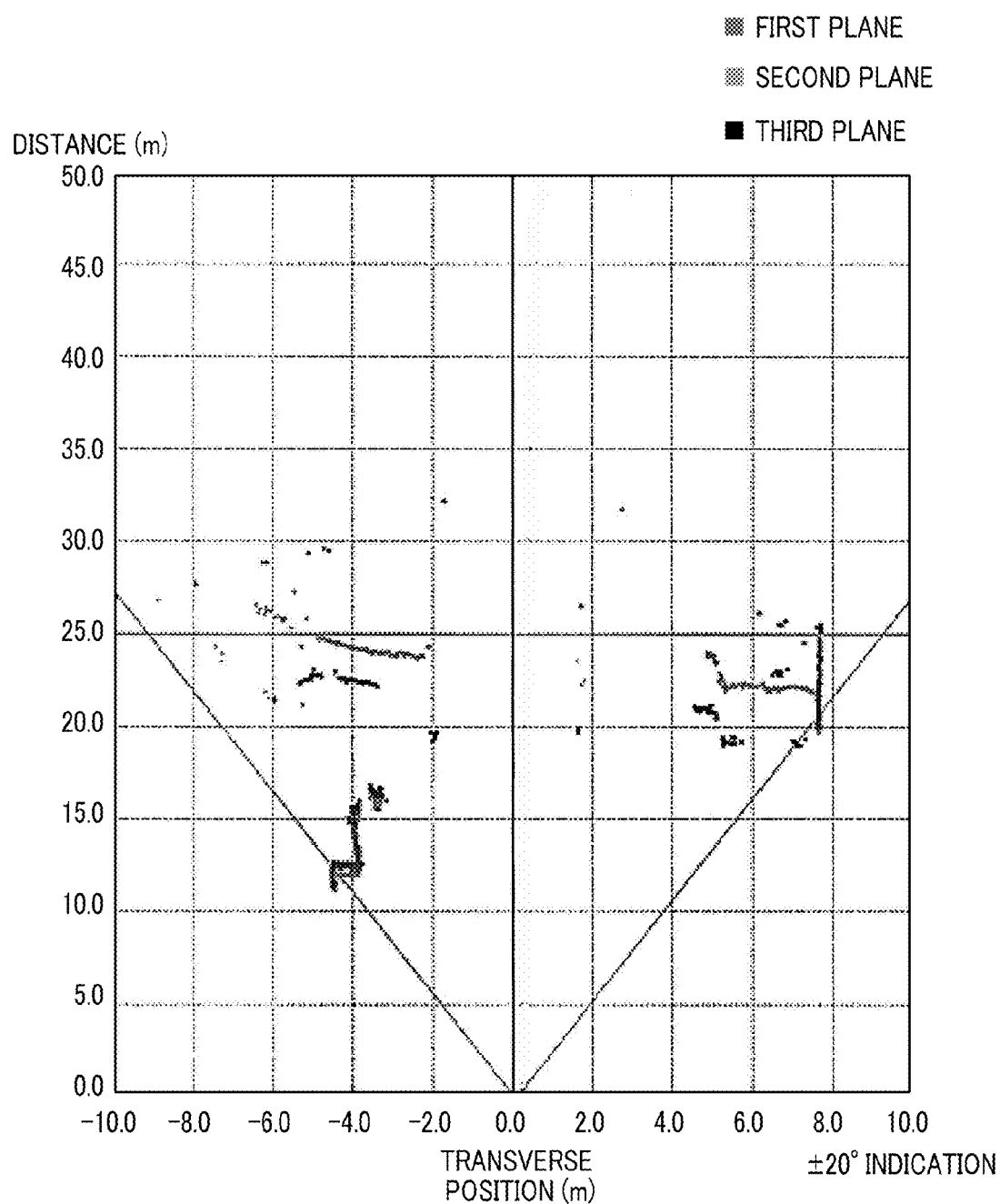
FIG. 11 is an explanatory diagram illustrating measured-distance data which is applied with the process of determining reflected datum as being the reflection from a climbing lane and removing the distance data.

Referring to FIGS. 10 and 11, more explanation is given. FIG. 11 shows measured-distance data in the case of applying the above procedure of determining a distance data as being from a climbing lane and removing the distance data. As a comparison, FIG. 10 shows measured-distance data in the case of not applying the above procedure of determination and removal.

In FIGS. 10 and 11, the horizontal axes each indicate transverse position (position in the X-axis direction in FIGS. 2 and 3) in meters (m). Similarly, the vertical axes each indicate distances (in the Y-axis direction in FIGS. 2 and 3) in meters (m).

Normally, in data obtained from flat land, the layer 3 (third plane) includes measured-distance data from a road surface, while the layers 1 and 2 (first and second planes) barely include measured-distance data from a road surface. However, regarding a climbing lane, when spatial object recognition is performed from a position opposed to the climbing lane, measured-distance data from the climbing lane will appear on all of the layers as shown in FIG. 10. An attempt, in this state, of recognizing an obstacle (three-dimensional object) in the forward direction will lead to erroneous recognition of the obstacle due to the measured-distance data from the climbing lane. As a result, correct object recognition is prevented.

In this regard, as can be easily understood from FIG. 11 in comparison with FIG. 10, use of the above procedure can remove the measured-distance data corresponding to the reflections from the climbing lane, and thus can reduce erroneous recognition in performing object recognition. It is true as a matter of fact that, as shown in FIG. 11, use of the present invention does not necessarily ensure removal, by 100%, of the measured-distance data corresponding to the reflections from a climbing lane. However, use of the present invention enables sufficient removal of measured-distance data corresponding to the reflections from a climbing lane (in particular, removal in an area on the front side of the object recognition apparatus 1), causing no problem.

When the object data generated by the object recognition apparatus 1 is used for an inter-vehicle control apparatus or a collision mitigation/avoidance apparatus, malfunction can be avoided, such as to erroneously recognize a climbing lane in the forward direction as being an obstacle (three-dimensional object), which would otherwise result in decelerating and stopping the vehicle concerned.

Thus, using the object recognition technique based on two-dimensional scan as a premise, a skillful determination is made referring to the requirements set forth above, based on the characteristics of measured-distance data, per se, associated with a road surface (including climbing lane). By only making such a determination, the measured-distance data can be determined as corresponding to the detection results of a road surface (including climbing lane).

In the present embodiment described above, since a determination on a distance data is made based on the frequency as to both of the distance and the reflection intensity, accuracy of recognition is enhanced. In other words, a determination on a distance data is made focusing on the distance and the reflection intensity. Relatively a lot of data are present in conformity with a road width. Therefore, if it is determined that data of not less than a predetermined number are present based on frequency, according to a road width, the measured-distance data can be accurately determined as corresponding to the reflections from a road surface (including climbing lane).

(Modifications)

An embodiment of the present invention has been described so far. However, the present invention is not limited to the embodiment described above but may be implemented in various modes within a scope not departing from the spirit of the present invention.

(1) For example, in the above embodiment, laser beams have been used as transmission waves. Alternatively however radio waves, such as millimeter waves, may be used.

(2) In the above embodiment, a polygon mirror with its sides having a different slant angle has been used for two-dimensional scan with laser beams. Alternatively, a galvanometer mirror may be used together with a mechanism which is able to change the slant angle of the sides of the mirror to similarly realize the two-dimensional scan. However, a polygon mirror is convenient in that two-dimensional scan is realized by only rotating and driving the mirror.

(3) The example shown in the above embodiment has dealt with the case where measured-distance data are obtained for three layers 1, 2 and 3. However, the number of layers may be two or more.

(4) In the above embodiment, measured-distance data have been removed after the measured-distance data have been determined as corresponding to the reflections from a road surface or a climbing lane. However, once the determination is made, the measured-distance data may be used for other purposes.

For example, once measured-distance data are determined as being from a climbing lane, another application may be used to perform control suitable for the climbing lane. Further, using the data that have been used for the climbing lane determination process, the inclination of the climbing lane may be estimated to perform control suitable for the inclination. For example, being an application with which special operation is performed in engine control on a climbing lane, if only a determination as being a climbing lane can be made, the data may not have to be removed.

What is claimed is:

1. An apparatus for recognizing presence of an object, the apparatus being mounted on a vehicle; the apparatus comprising:
    beam scanning means for scanning a beam-shaped electromagnetic wave toward a field of view outside the vehicle, the beam-shaped electromagnetic wave being transmitted repetitively at intervals two-dimensionally in both a width direction and multiple layers in a height direction of the vehicle, a reflected electromagnetic wave from the object being received by the beam scanning means;
    detecting means for detecting a reflection intensity of each of the transmitted electromagnetic waves and a distance between the apparatus and object based on a reception signal of the received of the electromagnetic wave, results detected by the detecting means showing detected reflection intensities and detected distance;
    characteristic obtaining means for obtaining, based on the results detected by the detecting means, characteristics presented by frequency distributions of the distance and intensity frequency distributions of the reception signal, respectively, in the multiple layers in the height direction, the characteristics depending on an angle of the electromagnetic wave to a road on which the vehicle travels; and
    determining means for determining that the characteristics obtained by the characteristic obtaining means have been obtained from the road when the characteristics meet a predetermined requirement.

2. An apparatus for recognizing presence of an object, the apparatus being mounted on a vehicle; the apparatus comprising:
    beam scanning means for scanning a beam-shaped electromagnetic wave toward a field of view outside the vehicle, the beam-shaped electromagnetic wave being transmitted repetitively at intervals two-dimensionally in both a width direction and multiple layers in a height direction of the vehicle, a reflected electromagnetic wave from the object being received by the beam scanning means;

detecting means for detecting a reflection intensity of each of the transmitted electromagnetic waves and a distance between the apparatus and object based on a reception signal of the received of the electromagnetic wave, results detected by the detecting means showing detected reflection intensities and detected distance;

first determining means for determining whether or not a search area defined by a position showing a result specified among a plurality of results detected by the detecting means includes a further result among the results;

producing means for producing a target by combining the plurality of results which allows the apparatus to recognize the object using the produced target when it is determined that the reference search area includes the further result; and second determining means for determining that the detected results are obtained from the road when the detected results meet both of first and second requirements, wherein the first requirement is that there is no detected results of further layers in the search area when the multiple layers of the field of view in the height direction are scanned, thereby showing that the target is a non-cubic target, and the second requirement is that, based on the detected results in scanning a predetermined layer in the height direction, i) first frequency distributions are obtained every range of a predetermined distance, and the first frequency distributions show that the detected results include a result exceeding a first threshold, the first threshold being set depending on the distance and corresponding to a lowest value of the distance frequency which is estimated to be generated by the detected result from reflection on the road, and ii) second frequency distributions are obtained every range of a predetermined reflection intensity range, and the second frequency distributions show that the detected results include a result exceeding a second threshold, the second threshold being set depending on the reflection intensity and corresponding to a lowest value of the reflection intensity frequency which is estimated to be generated by the detected result from reflection on the road is estimated to be generated.

3. The apparatus of claim 2, further comprising
deleting means for deleting the detected results determined by the second determining means; and
recognizing means for recognizing the object based on detected results that remain without being deleted by the deleting means.

4. The apparatus of claim 3, wherein the first and second thresholds in the second requirement are set using a width of the road as a benchmark.

5. The apparatus of claim 2, wherein the first and second thresholds in the second requirement are set using a width of the road as a benchmark.

6. An apparatus for recognizing presence of an object, the apparatus being mounted on a vehicle; the apparatus comprising:

beam scanning means for scanning a beam-shaped electromagnetic wave toward a field of view outside the vehicle, the beam-shaped electromagnetic wave being transmitted repetitively at intervals two-dimensionally in both a width direction and multiple layers in a height direction of the vehicle, a reflected electromagnetic wave from the object being received by the beam scanning means;

detecting means for detecting a reflection intensity of each of the transmitted electromagnetic waves and a distance between the apparatus and object based on a reception signal of the received of the electromagnetic wave, results detected by the detecting means showing detected reflection intensities and detected distance;

first determining means whether or not a search area defined by a position showing a result specified among a plurality of results detected by the detecting means includes a further result among the results;

producing means for producing the target by combining the plurality of results which allows the apparatus to recognize the object using the produced target when it is determined that the reference search area includes the further result; and second determining means for determining that the detected results are obtained from the road when the detected results meet both of first and third requirements, wherein the first requirement is that there is no detected results of further layers in the search area when the multiple layers of the field of view in the height direction are scanned, thereby showing that the target is a non-cubic target, and the third requirement is that, based on the detected results in scanning a plurality of layers in the height direction, i) first frequency distributions are obtained every range of a predetermined distance in each of the layers, and the first frequency distributions show that the detected results include a result exceeding a first threshold, the first threshold being set depending on the distance and corresponding to a lowest value of the distance frequency which is estimated to be generated by the detected result from reflection on the road which is climbing lane and distance ranges in which the detected results exceeding the third threshold are set based on a range of slope angles which are estimated to be the climbing lane, and ii) third frequency distributions are obtained every range of a predetermined reflection intensity range, and the third frequency distributions show that the detected results include a result exceeding a third threshold, the third threshold being set depending on the reflection intensity and corresponding to a lowest value of the reflection intensity frequency which is estimated to be generated by the detected result from reflection on the climbing lane is estimated to be generated.

7. The apparatus of claim 6, further comprising
deleting means for deleting the detected results determined by the second determining means; and
recognizing means for recognizing the object based on detected results that remain without being deleted by the deleting means.

8. The apparatus of claim 7, wherein the third threshold in the third requirement is set using a width of the road as a benchmark.

9. The apparatus of claim 8, wherein the distance ranges in which the detected results exceeding the third threshold are set based on both a range of slope angles estimated as the climbing lane and a spread angle of the beam-shaped electromagnetic wave in the height direction.

10. The apparatus of claim 7, wherein the distance ranges in which the detected results exceeding the third threshold are set based on both a range of slope angles estimated as the climbing lane and a spread angle of the beam-shaped electromagnetic wave in the height direction.

11. The apparatus of claim 6, wherein the third threshold in the third requirement is set using a width of the road as a benchmark.

12. The apparatus of claim 11, wherein the distance ranges in which the detected results exceeding the third threshold are set based on both a range of slope angles estimated as the climbing lane and a spread angle of the beam-shaped electromagnetic wave in the height direction.

13. A method of recognizing presence of an object, the method being implemented in a vehicle; comprising:
scanning a beam-shaped electromagnetic wave toward a field of view outside the vehicle, the beam-shaped electromagnetic wave being transmitted repetitively at intervals two-dimensionally in both a width direction and multiple layers in a height direction of the vehicle, a reflected electromagnetic wave from the object being received;
detecting a reflection intensity of each of the transmitted electromagnetic waves and a distance between the apparatus and object based on a reception signal of the received of the electromagnetic wave, detected results showing detected reflection intensities and detected distance;
obtaining, based on the detected results, characteristics presented by frequency distributions of the distance and intensity frequency distributions of the reception signal, respectively, in the multiple layers in the height direction, the characteristics depending on an angle of the electromagnetic wave to a road on which the vehicle travels; and
determining that the obtained characteristics are obtained from the road when the characteristics meet a predetermined requirement.

14. A method of recognizing presence of an object, the method being implemented in a vehicle, comprising steps of:
scanning a beam-shaped electromagnetic wave toward a field of view outside the vehicle, the beam-shaped electromagnetic wave being transmitted repetitively at intervals two-dimensionally in both a width direction and multiple layers in a height direction of the vehicle, a reflected electromagnetic wave from the object being received;
detecting a reflection intensity of each of the transmitted electromagnetic waves and a distance between the apparatus and object based on a reception signal of the received electromagnetic wave, results detected by the detecting step showing detected reflection intensities and detected distance;
first determining whether or not a search area defined by a position showing a result specified among a plurality of results detected by the detecting step includes a further result among the results;
producing the target by combining the plurality of results which allows the apparatus to recognize the object using the produced target when it is determined that the reference search area includes the further result;
second determining that the detected results are obtained from the road when the detected results meet both of first and second requirements, wherein
the first requirement is that there are no detected results of further layers in the search area when the multiple layers of the field of view in the height direction are scanned, thereby showing that the target is a non-cubic target, and
the second requirement is that, based on the detected results in scanning a predetermined layer in the height direction, i) first frequency distributions are obtained every range of a predetermined distance, and the first frequency distributions show that the detected results include a result exceeding a first threshold, the first threshold being set depending on the distance and corresponding to a lowest value of the distance frequency which is estimated to be generated by the detected result from reflection on the road, and ii) second frequency distributions are obtained every range of a predetermined reflection intensity range, and the second frequency distributions show that the detected results include a result exceeding a second threshold, the second threshold being set depending on the reflection intensity and corresponding to a lowest value of the reflection intensity frequency which is estimated to be generated by the detected result from reflection on the road is estimated to be generated.

15. A method of recognizing presence of an object, the method being implemented in a vehicle; the method comprising steps of:
scanning a beam-shaped electromagnetic wave toward a field of view outside the vehicle, the beam-shaped electromagnetic wave being transmitted repetitively at intervals two-dimensionally in both a width direction and multiple layers in a height direction of the vehicle, a reflected electromagnetic wave from the object being received;
detecting a reflection intensity of each of the transmitted electromagnetic waves and a distance between the apparatus and object based on a reception signal of the received of the electromagnetic wave, results detected by the detecting step showing detected reflection intensities and detected distance;
first determining whether or not a search area defined by a position showing a result specified among a plurality of results detected by the detecting step includes a further result among the results;
producing the target by combining the plurality of results which allows the apparatus to recognize the object using the produced target when it is determined that the reference search area includes the further result;
second determining that the detected results are obtained from the road when the detected results meet both of first and third requirements, wherein
the first requirement is that there are no detected results of further layers in the search area when the multiple layers of the field of view in the height direction are scanned, thereby showing that the target is a non-cubic target, and
the third requirement is that, based on the detected results in scanning a plurality of layers in the height direction, i) first frequency distributions are obtained every range of a predetermined distance in each of the layers, and the first frequency distributions show that the detected results include a result exceeding a first threshold, the first threshold being set depending on the distance and corresponding to a lowest value of the distance frequency which is estimated to be generated by the detected result from reflection on the road which is climbing lane and distance ranges in which the detected results exceeding the third threshold are set based on a range of slope angles which are estimated to be the climbing lane,
and ii) third frequency distributions are obtained every range of a predetermined reflection intensity range, and the third frequency distributions show that the detected results include a result exceeding a third threshold, the third threshold being set depending on the reflection intensity and corresponding to a lowest value of the reflection intensity frequency which is estimated to be generated by the detected result from reflection on the climbing lane is estimated to be generated.

\* \* \* \* \*